(12) United States Patent
Spatafora et al.

(10) Patent No.: US 6,349,818 B1
(45) Date of Patent: Feb. 26, 2002

(54) METHOD AND DEVICE FOR DYNAMIC CONTROL OF AN OBJECT ALONG A PATH

(75) Inventors: Mario Spatafora, Bologna; Loris Grepioni, Castel Maggiore, both of (IT)

(73) Assignee: G.D Societa' per Azioni, Bologna (IT)

(*) Notice: Subject to any disclaimer, the term of this patent is extended or adjusted under 35 U.S.C. 154(b) by 30 days.

(21) Appl. No.: 09/597,475

(22) Filed: Jun. 20, 2000

(30) Foreign Application Priority Data

Jun. 30, 1999 (IT) ........................ BO99A0353

(51) Int. Cl.[7] ........................ B65G 15/60; B65G 21/20; B65G 23/18
(52) U.S. Cl. ........................ 198/805
(58) Field of Search ........................ 198/805

(56) References Cited

U.S. PATENT DOCUMENTS

| | | | |
|---|---|---|---|
| 4,892,186 A | * | 1/1990 | Frei |
| 5,172,803 A | * | 12/1992 | Lewin |
| 5,476,035 A | | 12/1995 | Florindez ............ 99/443 C |
| 6,129,201 A | * | 10/2000 | Langhans |
| 6,155,406 A | * | 12/2000 | Garbagnati |

FOREIGN PATENT DOCUMENTS

| | | |
|---|---|---|
| EP | 0276409 | 8/1988 |
| EP | 0496046 | 7/1992 |

OTHER PUBLICATIONS

English Abstract of EP 0276409 dated Aug. 3, 1988.

* cited by examiner

Primary Examiner—Joseph D. Pape
Assistant Examiner—Scott Carpenter
(74) Attorney, Agent, or Firm—Ladas & Parry

(57) ABSTRACT

A method and device for imparting a given law of motion to an object traveling along a path, whereby at least one timing body is fed along the path with the same given law of motion, and generates a magnetic field which interacts with at least one portion of the object to connect the object magnetically to the timing body.

10 Claims, 2 Drawing Sheets

METHOD AND DEVICE FOR DYNAMIC CONTROL OF AN OBJECT ALONG A PATH

The present invention relates to a method for dynamic control of an object along a path.

In particular, the present invention relates to a method of imparting a given law of motion to an object traveling along a path.

The present invention may be used to advantage on continuous packing machines, to which the following description refers purely by way of example.

BACKGROUND OF THE INVENTION

To feed articles along a wrapping path, certain known continuous packing machines (for example of the type disclosed in EP-A1-496046) employ a conveyor having a series of carriages (or trains of carriages) fed along a fixed guide by an actuating device. Along one or more portions of the path, each carriage must be fed according to a given law of motion to time the carriage with respect to, and enable the carriage to cooperate with, other movable members along the path, and so prevent improper timing resulting in damage to the packing machine.

On known packing machines of the type described above, each carriage is timed along a portion of the path by engaging the carriage mechanically by means of a locating member, which advances according to the desired law of motion and normally engages a seat formed in the bottom of the carriage. This solution poses several drawbacks by the locating members engaging and releasing the respective seats cyclically, thus resulting, especially during engagement, in a relatively high noise level caused by the impact of each locating member against the walls of the respective seat, and, above all, in severe wear of the locating member-seat connection.

EP-A2-276409 or US-A1-5476035 discloses a magnetic conveyor having a plurality of carriages, each of which is fed along a given path by connecting such carriage to a traveling body using a magnetic field generated by the body or the carriage. The magnetic conveyors disclosed in both EP-A2-276409 and US-A1-5476035 may be advantageously used for feeding a carriage along a linear path with a relatively low speed and precision in position, but are not able to give the relatively high performances of conveyance (i.e. high speed and/or high precision in position) requested by a timing device of a modern packaging machine.

SUMMARY OF THE INVENTION

It is an object of the present invention to provide a method for dynamic control of an object along a path, designed to eliminate the aforementioned drawbacks, and which, in particular, is straightforward and cheap to implement.

According to the present invention, there is provided a method for dynamic control of an object along a path as recited in claim 1.

The present invention also relates to a device for timing an object along a path.

According to the present invention, there is also provided a device for dynamic control of an object along a path as recited in claim 6.

BRIEF DESCRIPTION OF THE DRAWINGS

The present invention will now be described by way of example with reference to the accompanying drawings, in which.

DETAILED DESCRIPTION OF THE INVENTION

Figure 1:
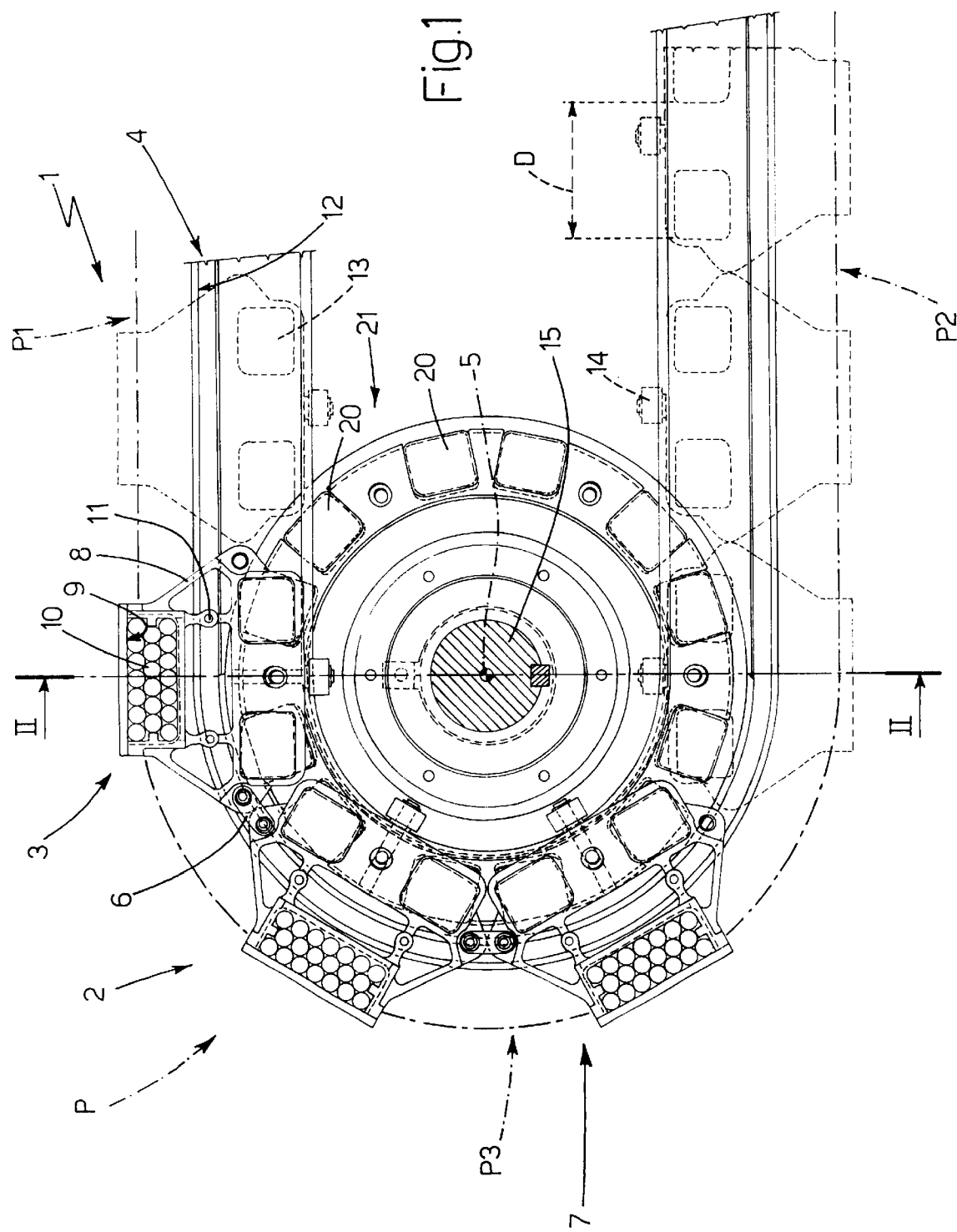
FIG. 1 shows a partial, partly sectioned, schematic side view of a preferred embodiment of the device according to the present invention.

Number 1 in FIG. 1 indicates as a whole a conveyor (shown partly) for feeding a train 2 of carriages 3 along a path P defined by two rails 4 (only one shown in FIG. 1) and comprising a horizontal, straight forward portion P1 and a horizontal, straight return portion P2 (both shown partly in FIG. 1) parallel to each other and connected to each other by a semicircular portion P3 extending about a horizontal central axis 5 perpendicular to the FIG. 1 plane.

Train 2 comprises three identical carriages 3 connected mechanically to one another by respective connecting arms 6, each of which is hinged to the ends of two respective adjacent carriages 3 to enable carriages 3 to rotate with respect to each other along the curved portions of path P.

Along straight portions P1 and P2, carriages 3 are run along rails 4 by a known actuating device (not shown), which, in one embodiment not shown, comprises a linear electric motor, and, in an alternative embodiment not shown, comprises a releasable connecting member for mechanically connecting each carriage 3 to a chain traveling parallel to rails 4.

Conveyor 1 comprises a timing device 7 for feeding train 2 of carriages 3 along portion P3 with a given law of motion and in time with known external operating means (not shown) cooperating with carriages 3 along portion P3.

Figure 2:
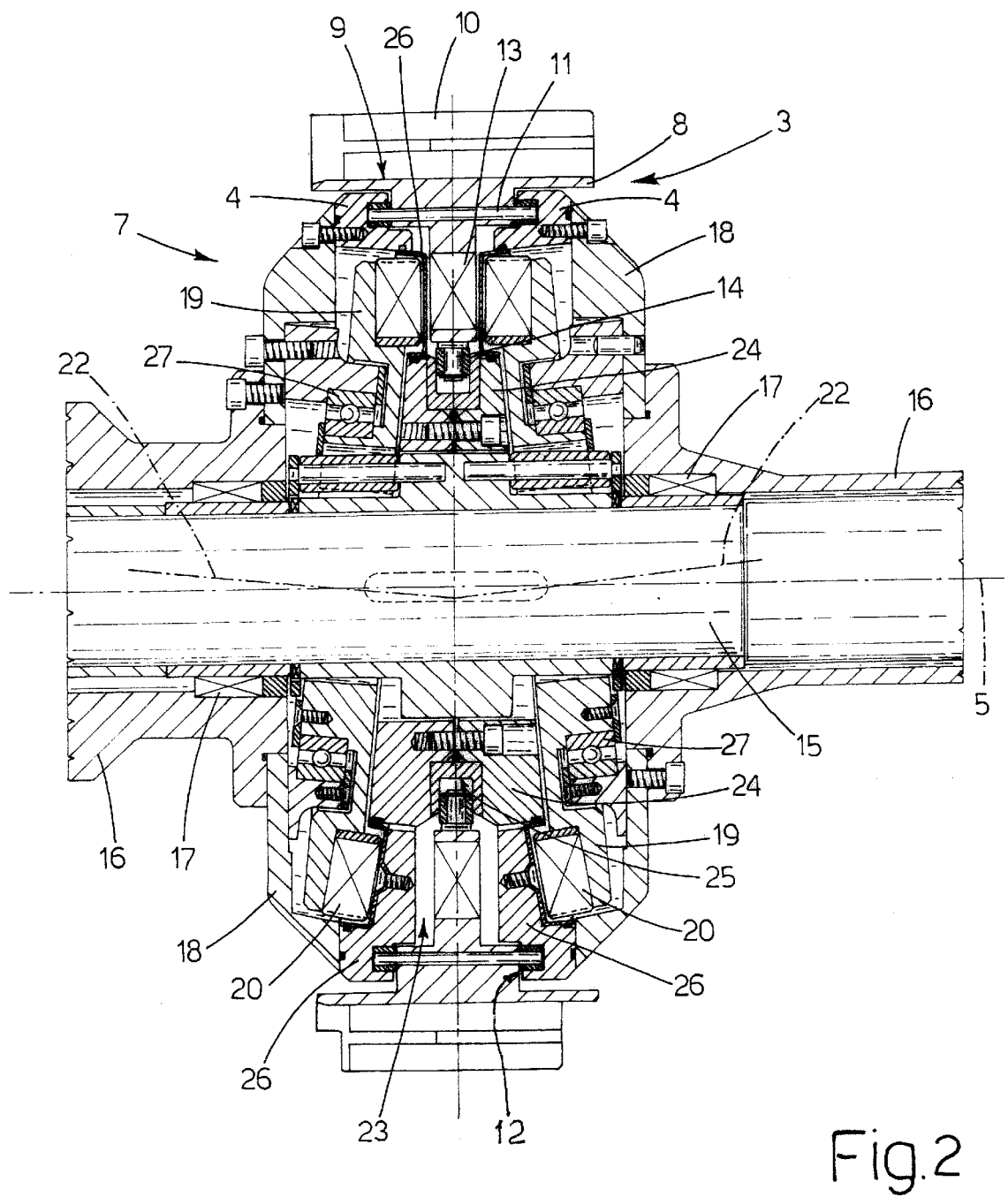
FIG. 2 shows a section along line II—II in FIG. 1.

As shown in FIGS. 1 and 2, each carriage 3 comprises a frame 8 made of nonmagnetic material (e.g. aluminium or plastic) and supporting an upper box 9 for housing an article 10 (defined in the FIG. 1 example by a group of cigarettes) to be conveyed along path P; two horizontal pins 11, each end of each of which extends outwards of frame 8 and defines a slide engaging in transversely sliding manner an axial seat 12 in a respective rail 4; two permanent magnets 13 forming part of timing device 7 and located a given distance D apart; and a bottom pin 14 extending downwards from and integral with frame 8.

As shown in FIG. 2, in addition to permanent magnets 13 of each carriage 3, timing device 7 also comprises a powered shaft 15 coaxial with axis 5 and supported by a hollow fixed frame 16 via the interposition of two bearings 17. Along portion P3, frame 16 supports rails 4 by means of annular bodies 18 connected to rails 4 and to frame 16 by means of respective screws.

Timing device 7 also comprises two disks 19 fitted to shaft 15 and each supporting a number of permanent magnets 20, each facing a permanent magnet 20 on the other disk 19. Magnets 20 of each disk 19 are divided into pairs 21 equally spaced along disk 19, with the magnets 20 in each pair 21 separated by a distance equal to distance D. Disks 19 have respective axes 22 lying in plane II—II, at an angle to each other, and oppositely inclined to define, between disks 19, a variable-section, semicircular passage 23 through which travels the bottom portion of each carriage 3 supporting permanent magnets 13. Disks 19 being oppositely inclined with respect to shaft 15, passage 23 is relatively narrow at an initial portion of portion P3, and relatively wide at an end portion of portion P3.

A fixed semiannular body 24 is housed in the gap between the two disks 19 and radially inwards of passage 23, and has, along the outer periphery, a semicircular groove 25 coaxial with shaft 15 and engaged in transversely sliding manner by bottom pins 14 of carriages 3. Shielding members 26 made of ferromagnetic material (preferably magnetic steel) are fitted in fixed positions to body 24 and to rails 4 so as to be interposed between permanent magnets 20 of disks 19 and permanent magnets 13 of carriages 3 at an initial portion and end portion of portion P3; and the thickness of shielding members 26 varies from a maximum at the ends facing portions P1 and P2, to a minimum of substantially zero at the ends facing the central portion of portion P3.

Thrust bearings 27 are interposed between frame 16 and intermediate portions of disks 19 to enable the axial thrust produced by in-service electromagnetic interaction of permanent magnets 13 and 20 to be transmitted by disks 19 to frame 16.

Operation of timing device 7 will now be described with reference to FIGS. 1 and 2 and to a train 2 comprising three carriages 3 as in the example shown.

Train 2 is fed along portion PI by said known actuating device (not shown)—preferably a linear electric motor— until the first carriage 3 in train 2 engages portion P3, where the bottom portion of carriage 3 engages passage 23, and the interacting magnetic forces established between the two permanent magnets 13 of carriage 3 and two corresponding pairs 21 of permanent magnets 20 on the two disks 19 move and lock carriage 3 into a given fixed position with respect to disks 19. From this moment on, train 2 is fed along portion P3 in perfect time with the rotation of disks 19, by each pair 21 of magnets 20 acting as a timing member to time carriages 3 with disks 19 along portion P3.

For timing device 7 to work properly, the polarities of a permanent magnet 13 and of the two respective permanent magnets 20 facing magnet 13 in use must obviously be opposite at all times, so that the forces between magnets 13 and 20 are always of attraction and never of repulsion. This condition is met substantially at all times, by the positioning error of train 2 of carriages 3 with respect to disks 19 being relatively small (about a few millimeters) at all times, and such as never to result in a relative position in which opposite polarities are positioned facing.

Magnets 13 are maintained in a substantially fixed position with respect to respective magnets 20 along portion P3, but change position with respect to magnets 20 along the portions connecting portion P3 to portions P1, P2; which change in position is opposed or assisted by the forces of magnetic attraction generated along portion P3, thus resulting in severe mechanical stress of both carriages 3 and disks 19. The purpose of shielding members 26 is to considerably reduce the intensity of such stress, which is done by interposing a member of ferromagnetic material between a magnet 13 and respective magnet 20, so that the magnetic field lines of each magnet 13, 20 tend to close in the iron without affecting the other magnet 20, 13, thus greatly reducing the forces of electromagnetic attraction between the two magnets 13 and 20.

The tilt of disks 19 with respect to shaft 15 provides for obtaining a passage 23 varying in width along portion P3, and, hence, a force of electromagnetic attraction between magnets 13 and 20 which also varies along portion P3 by being closely dependent on the distance between magnets 13 and 20. For effective timing, while at the same time reducing mechanical stress, disks 19 are so tilted as to obtain a relatively narrow passage 23 where more accurate timing is required, and a relatively wide passage 23 where magnets 13 and 20 move away from one another. In the example shown, the choice made is for extremely precise position control at an input portion of portion P3.

In an alternative embodiment not shown, permanent magnets 13 are replaced by members made of ferromagnetic material and which, in use, interact with the magnetic field generated by permanent magnets 20.

In yet a further embodiment not shown, permanent magnets 20 are replaced by electromagnets.

Timing device 7 as described is particularly advantage for use in conjunction with said known actuating device (not shown) comprising a linear electric motor, by permanent magnets 13 of carriages 3 being used as part of both timing device 7 and the linear electric motor.

What is claimed is:

1. A method for dynamic control of an object along a path to time the object (3) with a timing member (21); said object (3) being so formed that at least one portion (13) of the object interacts with a magnetic field; the method providing for moving said timing member (21) along said path (P3) with a given law of motion; generating a magnetic field by means of said timing member (21); and connecting the object (3) magnetically to the timing member (21) along said path (P3); the method being characterized in that the magnetic field generated by said timing member (21) is shielded at an initial portion and an end portion of said path (P3) by interposing a member (26) of ferromagnetic material between said object (3) and the timing member (21).

2. A method as claimed in claim 1, wherein said object (3) is fed along said path (P3) by said timing member (21); said object (3) being mounted to run freely along a fixed guide (4).

3. A method for dynamic control of an object along a path to time the object (3) with a timing member (21); said object (3) being so formed that at least one portion (13) of the object interacts with a magnetic field; the method providing for moving said timing ember (21) along said path (P3) with a given law of motion; generating a magnetic field by means of said timing member (21); and connecting the object (3) magnetically to the timing member (21) along said path (P3); the method being characterized in that a distance between said timing member (21) and said object (3) is varied along said path (P3) so as to vary, from one point to another of said path (P3) and according to given law of variation, a magnetic interaction between said object (3) and said timing member (21).

4. A method as claimed in claim 3, wherein said distance is of a first value at an initial portion of said path (P3), and of a second value at an end portion of said path (P3); said first value being lower than said second value to assist disengagement of said object (3) and said timing member (21) at an output end of said end portion.

5. A method as claimed in claim 3, wherein said object (3) is fed along said path (P3) by said timing member (21); said object (3) being mounted to run freely along a fixed guide (4).

6. A device for dynamic control of an object along a path; the device comprising at least one timing member (21); a conveyor (19) for feeding the timing member (21) along said path (P3) and with a given law of motion; and first and second magnetic connecting means (13, 30) located respectively on said object (3) and on said timing member (21), and for magnetically connecting the object (3) and the timing member (21) in response to a magnetic field generated by at least one of said first and second magnetic connecting means (13; 20); characterized in comprising magnetic-field shielding means (26) located at an initial portion and an end portion of said path (P3).

7. A device as claimed in claim 6, wherein each shielding means (26) is defined by a fixed member (26) made of ferromagnetic material and interposed between said object (3) and the respective said timing member (21).

8. A device for dynamic control of an object along a path; the device comprising at least one timing member (21); a conveyor (19) for feeding the timing member (21) along said path (P3) and with a given law of motion; and first and second magnetic connecting means (13, 30) located respectively on said object (3) and on said timing member (21), and for magnetically connecting the object (3) and the timing member (21) in response to a magnetic field generated by at least one of said first and second magnetic connecting means (13; 20); characterized in that said path (P3) is a semicircular path (P3); said conveyor comprising comprises two identical powered disks (19), each coaxial with said semicircular path (P3) and supporting a number of permanent magnets (20) defining a number of said timing members (21); the two disks (19) being synchronous with each other, and being spaced axially apart to define, in between, a semicircular passage (23); said object (3) comprising a bottom portion which engages said passage (23) and has at least one permanent magnet (13) which interacts with a magnetic field generated by a respective timing member (21); and said permanent magnets (13, 20) defining said first and second magnetic connecting means (13, 20).

9. A device as claimed in claim 8, wherein each said disk (19) is tilted, with respect to an axis (5) of said semicircular path (P3), by the same angle as but in the opposite direction with respect to the other disk (19).

10. A device as claimed in claim 8, and further comprising a fixed guide (4) extending along said path (P3); said object (3) being mounted to run freely along said fixed guide (4).

* * * * *